US011923647B2

(12) United States Patent
Chen et al.

(10) Patent No.: US 11,923,647 B2
(45) Date of Patent: Mar. 5, 2024

(54) CONDUCTIVE MECHANISM AND LAMP

(71) Applicant: Radiant Opto-Electronics Corporation, Kaohsiung (TW)

(72) Inventors: Chung-Kuang Chen, Kaohsiung (TW); Chih-Hung Ju, Kaohsiung (TW); Guo-Hao Huang, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/105,786

(22) Filed: Feb. 3, 2023

(65) Prior Publication Data

US 2023/0213177 A1 Jul. 6, 2023

Related U.S. Application Data

(63) Continuation of application No. PCT/CN2022/082652, filed on Mar. 24, 2022.

(30) Foreign Application Priority Data

Dec. 30, 2021 (CN) ......................... 202111652527.9

(51) Int. Cl.

*H01R 39/64* (2006.01)
*F21V 21/008* (2006.01)
*F21V 23/00* (2015.01)
*H01R 35/02* (2006.01)

(52) U.S. Cl.

CPC ........... *H01R 39/64* (2013.01); *F21V 21/008* (2013.01); *F21V 23/002* (2013.01); *H01R 35/025* (2013.01)

(58) Field of Classification Search

CPC ...... F21V 23/001; F21V 23/002; F21V 23/06; F21V 21/008; H01R 13/17; H01R 13/18; H01R 13/187; H01R 13/2421

See application file for complete search history.

(56) References Cited

U.S. PATENT DOCUMENTS 3,439,160 A * 4/1969 Andreaggi ............. H01R 33/00 362/372
5,063,276 A * 11/1991 Woodard ................. H01H 1/18 200/530
6,726,342 B1 * 4/2004 Lai ......................... F21V 14/045 362/372
6,776,668 B1 * 8/2004 Scyoc .................... H01R 24/50 439/700

(Continued)

FOREIGN PATENT DOCUMENTS

CN 2593044 Y 12/2003
CN 2725099 Y * 9/2005

(Continued)

*Primary Examiner* — Alexander K Garlen
(74) *Attorney, Agent, or Firm* — Winston Hsu

(57) ABSTRACT

A conductive mechanism includes two bases, an inner conductive spring and an outer conductive spring. The two bases are opposite to each other. Each of the bases includes a surface and a partition wall protruding relative to the surface. The inner conductive spring is disposed at inner sides of the two partition walls of the two bases. The outer conductive spring is disposed at outer sides of the two partition walls of the two bases. At least one of two ends of each of the inner conductive spring and the outer conductive spring rotatably abuts against the surface of one of the bases.

18 Claims, 11 Drawing Sheets

(56) References Cited

U.S. PATENT DOCUMENTS

| | | | | |
|---|---|---|---|---|
| 7,121,677 | B2 * | 10/2006 | Huang | F21V 31/00 362/198 |
| 7,599,486 | B1 | 10/2009 | Rivas | |
| 2008/0080175 | A1 * | 4/2008 | Lee | F21V 14/02 362/217.05 |
| 2009/0009991 | A1 * | 1/2009 | Liu | F21V 23/06 362/206 |

FOREIGN PATENT DOCUMENTS

| | | | | | |
|---|---|---|---|---|---|
| CN | 2725099 | Y | | 9/2005 | |
| CN | 201822084 | U | | 5/2011 | |
| CN | 203449802 | U | | 2/2014 | |
| CN | 204083841 | U | | 1/2015 | |
| CN | 204144578 | U | | 2/2015 | |
| CN | 104768351 | A | | 7/2015 | |
| CN | 109244711 | A | * | 1/2019 | G02B 6/3821 |
| CN | 212719633 | U | | 3/2021 | |
| CN | 213601789 | U | | 7/2021 | |
| CN | 113451064 | A | | 9/2021 | |
| CN | 113471737 | A | * | 10/2021 | |
| EP | 2009318 | A1 | * | 12/2008 | F16F 1/046 |
| WO | 2006/109616 | A1 | | 10/2006 | |

* cited by examiner

CONDUCTIVE MECHANISM AND LAMP

CROSS REFERENCE TO RELATED APPLICATIONS

This application is a continuation application of PCT Application No. PCT/CN2022/082652, filed on Mar. 24, 2022, which claims priority of China Application No. 202111652527.9, filed on Dec. 30, 2021. The entire disclosures of all the above applications are incorporated herein by reference.

BACKGROUND OF THE INVENTION

1. Field of the Invention

The present disclosure relates to a conductive mechanism and a lamp, and more particularly, to a conductive mechanism having degrees of freedom of shift and rotation and a lamp having the winding mechanism.

2. Description of the Prior Art

In general, electronic products are equipped with conductive mechanism for electrically connecting a power supply and a power consumption unit. Taking a pendant lamp as an example, the conductive mechanism includes two sets of conductive terminals and a conductive wire for electrically connecting the two sets of conductive terminals. One set of the conductive terminals is configured to connect to a utility power, and the other set of the conductive terminals is configured to connect a lamp body.

However, the conductive wire of the conductive mechanism is usually fixedly connected to the conductive terminals with two ends, and the conducive wire is made of rigid material. Based on the aforementioned characteristics of the wire mechanism, the structural design of electronic products is limited. It is not beneficial to improve the design freedom of the electronic products. Accordingly, it is not beneficial to improve the performance of electronic products and broaden the application range thereof.

SUMMARY OF THE INVENTION

According to one embodiment of the present disclosure, a conductive mechanism includes two bases, an inner conductive spring and an outer conductive spring. The two bases are opposite to each other. Each of the bases includes a surface and a partition wall protruding relative to the surface. The inner conductive spring is disposed at inner sides of the two partition walls of the two bases. The outer conductive spring is disposed at outer sides of the two partition walls of the two bases. At least one of two ends of each of the inner conductive spring and the outer conductive spring rotatably abuts against the surface of one of the bases.

According to another embodiment of the present disclosure, a lamp includes the aforementioned conductive mechanism and a lamp body. The lamp body is electrically connected to the inner conductive spring and the outer conductive spring.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part thereof, and in which is shown by way of illustration specific embodiments in which the disclosure may be practiced. In this regard, directional terminology, such as up, down, left, right, front, back, bottom, top, etc., is used with reference to the orientation of the Figure(s) being described. As such, the directional terminology is used for purposes of illustration and is in no way limiting. In addition, identical numeral references or similar numeral references are used for identical elements or similar elements in the following embodiments. In the present disclosure, when an element is connected to another element, it may refer that the two elements are connected directly, that is, there is no other element between the two elements, or it may refer that the two elements are connected indirectly, that is, other elements may be disposed between the two elements.

Figure 1:
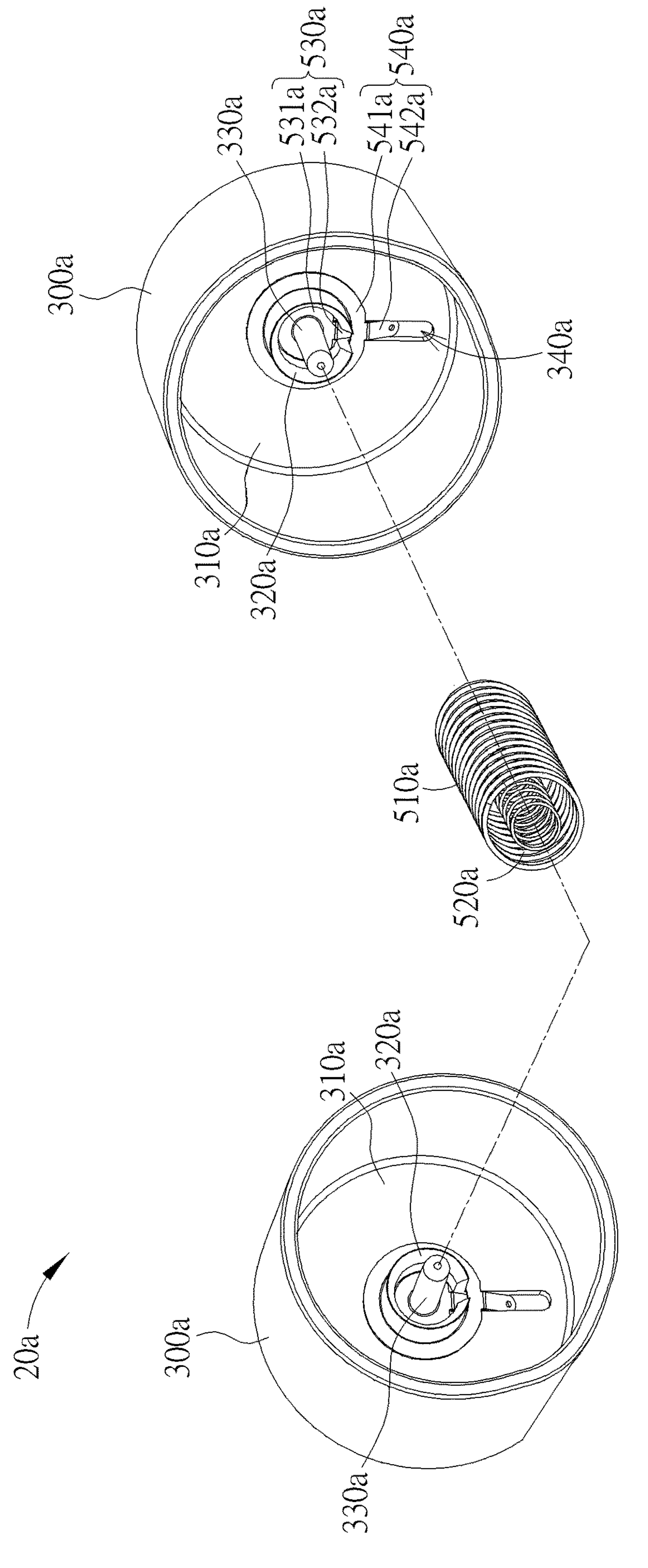
FIG. 1 is an exploded schematic view showing a conductive mechanism according to one embodiment of the present disclosure.
Figure 2:
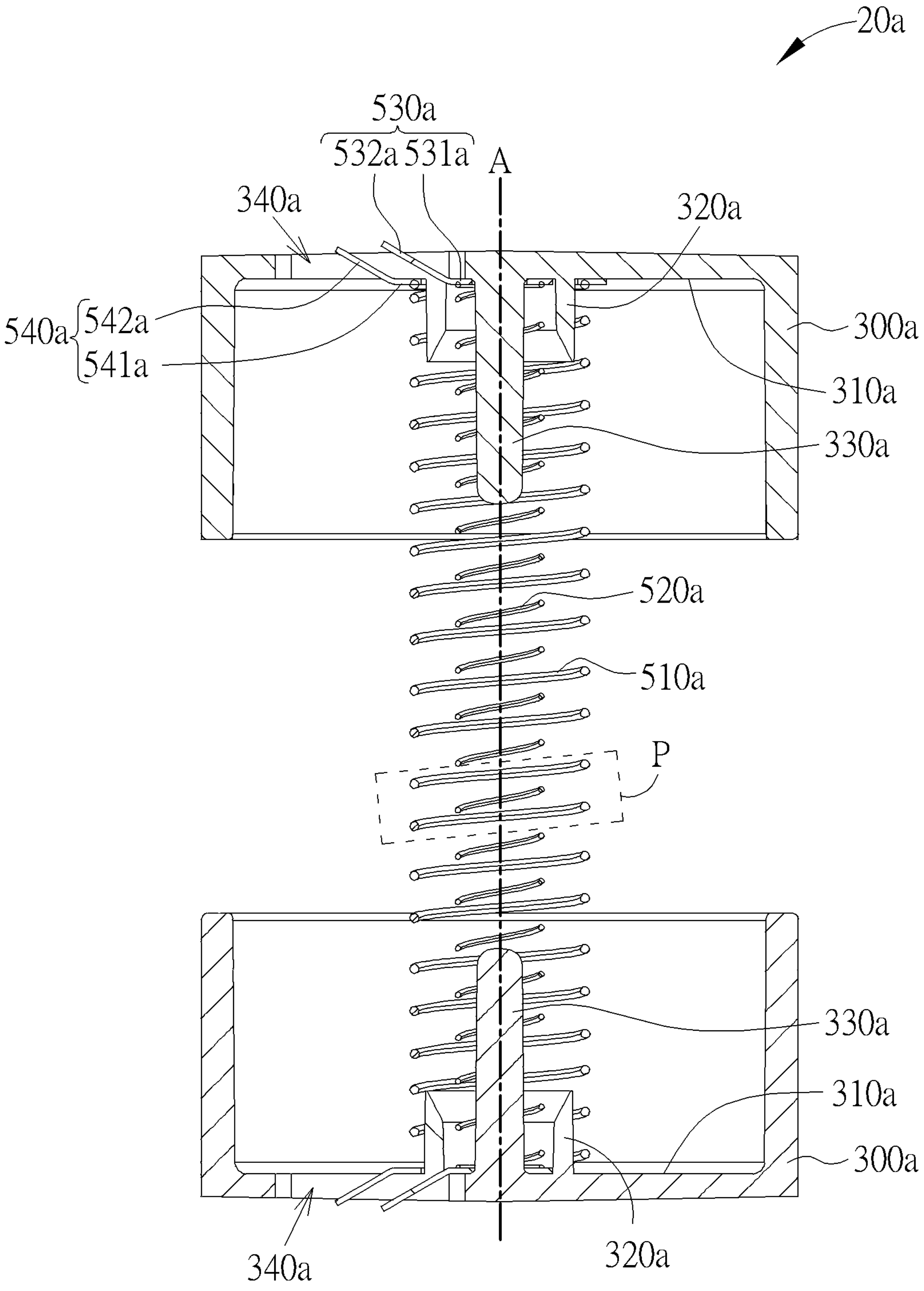
FIG. 2 is a cross-sectional view showing a combination state of the conductive mechanism of FIG. 1.
Figure 3:
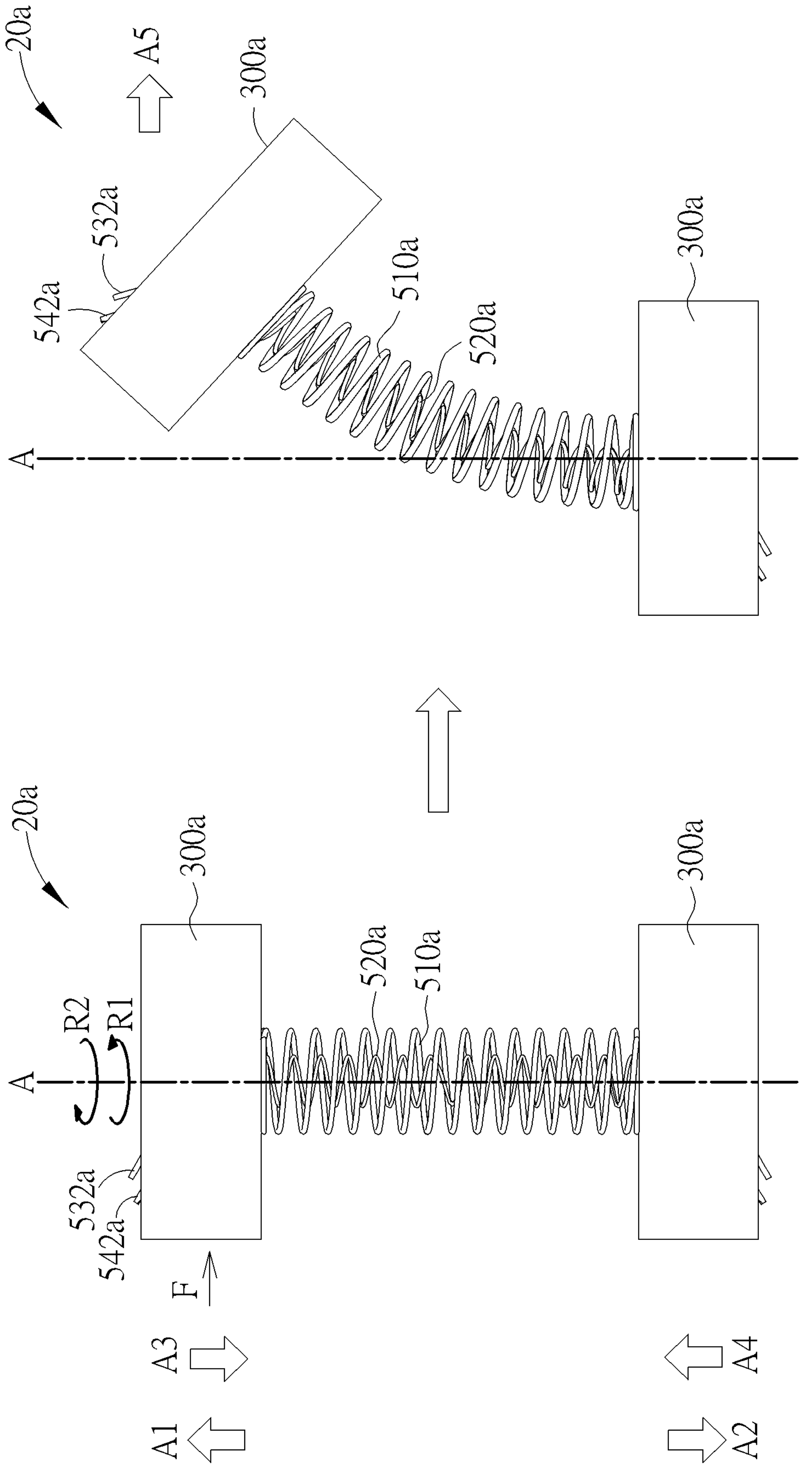
FIG. 3 is an operational schematic view of the conductive mechanism of FIG. 2.

Please refer to FIG. 1 to FIG. 3. FIG. 1 is an exploded schematic view showing a conductive mechanism **20*a* according to one embodiment of the present disclosure. FIG. 2 is a cross-sectional view showing a combination state of the conductive mechanism 20*a* of FIG. 1. FIG. 3 is an operational schematic view of the conductive mechanism 20*a* of FIG. 2. The conductive mechanism 20*a* includes two bases 300*a*, an inner conductive spring 520*a* and an outer conductive spring 510*a*. The two bases 300*a* are opposite to each other. Each of the two bases 300*a* includes a surface 310*a* and a partition wall 320*a* protruding relative to the surface 310*a*. The inner conductive spring 520*a* is disposed at inner sides of the two partition walls 320*a* of the two bases 300*a*, and the outer conductive spring 510*a* is disposed at outer sides of the two partition walls 320*a* of the two bases 300*a*. One end of each of the inner conductive spring 520*a*** and the outer conductive spring 510*a* rotatably abuts against the surface 310*a* of one of the bases 300*a*, and the other end of each of the inner conductive spring 520*a* and the outer conductive spring 510*a* rotatably or fixedly abuts against the surface 310*a* of the other base 300*a*. With the aforementioned arrangement, the two bases 300*a* can be opposite to each other in a manner that the two bases 300*a* are capable of displacing along an axial direction A and/or rotating about the axial direction A. Moreover, the two bases 300*a* can be opposite to each other in a manner that the two bases 300*a* are capable of deviating from the axial direction A. Therefore, the conductive mechanism 20*a* has degrees of freedom of shift and rotation.

Specifically, the conductive mechanism 20*a* can define an axial direction A. As shown in the state at the left side of FIG. 3, the inner conductive spring 520*a* and the outer conductive spring 510*a* have a degree of freedom to elongate or compress along the axial direction A, so that the two bases 300*a* can be opposite to each other in a manner that the two bases 300*a* are capable of displacing along the axial direction A. For example, the inner conductive spring 520*a* and the outer conductive spring 510*a* are capable of elongating along the axial direction A, so that the two bases 300*a* can be respectively displaced along the directions of arrow A1 and arrow A2 to move away from each other. The inner conductive spring 520*a* and the outer conductive spring 510*a* are capable of compressing along the axial direction A, so that the two bases 300*a* can be displaced along the directions of arrow A3 and arrow A4 to move toward each other. At least one end of each of the inner conductive spring 520*a* and the outer conductive spring 510*a* is configured to rotatable relative to the base 300*a*. Compared with the manner of two-end fixation, when one of the bases 300*a* is operated to rotate about the axial direction A along a direction of arrow R1 or arrow R2 and the other bases 300*a* is fixed, the inner conductive spring 520*a* and the outer conductive spring 510*a* will not rotate with the base 300*a* that rotates, so that the inner conductive spring 520*a* and the outer conductive spring 510*a* can be prevented from twisting and entangling. Similarly, when the two bases 300*a* are operated to respectively rotate about the axial direction A along the directions of arrow R1 and arrow R2, the two ends of the inner conductive spring 520*a* and the outer conductive spring 510*a* will not rotate with the two bases 300*a*, so that the inner and outer conductive springs 520*a*, 510*a* can be prevented from twisting and entangling. Thereby, the inner and outer conductive springs 520*a*, 510*a* can be prevented from being knotted, stuck or broken due to excessive twisting. The displacement of the two bases 300*a* along the axial direction A and the rotation of the two bases 300*a* about the axial direction A can be performed independently or simultaneously. Moreover, the two bases 300*a* can also be displaced along directions other than the axial direction A. For example, when an external force F along a direction of arrow A5 is exerted on the base 300 located above, the base 300*a* located above can be displaced along the direction of arrow A5 relative to the base 300*a* located below, so that the state of the conductive mechanism 20*a* changes from the left side to the right side of FIG. 3. That is, the two bases 300*a* can be opposite to each other in a manner that the two bases 300*a* are capable of deviating from the axial direction A. Similarly, the base 300*a* located above can be displaced relative to the base 300*a* located below along a direction other than the axial direction A. In the case that the base 300*a* located above is capable of displacing relative to the base 300*a* located below along a direction different from the axial direction A, the two ends of the inner conductive spring 520*a* and the outer conductive spring 510*a* respectively abut against two surfaces 310*a* of the two bases 300*a* and the inner conductive spring 520*a* and the outer conductive spring 510*a* are bent toward the displacement direction at the same time. In other words, the two bases 300*a* are capable of shift and/or rotating relative to each other, so that the conductive mechanism 20*a* has the degrees of freedom of shift and rotation. When the conductive mechanism 20*a* is applied to electronic products, the design freedom of electronic products can be improved, which is beneficial to improve the performance of electronic products and broaden the application range thereof.

Each of the two bases 300*a* can include a protruding pole 330*a*. Each of the protruding poles 330*a* protrudes relative to the surface 310*a* and disposed at the inner side of the partition wall 320*a*. The inner conductive spring 520*a* is sleeved on the protruding poles 330*a*. Therefore, the positioning stability of the inner conductive spring 520*a* can be improved.

The conductive mechanism 20*a* can further include two inner conductive members 530*a* and two outer conductive members 540*a*. The two inner conductive members 530*a* are respectively disposed in the two bases 300*a* and abut against the two ends of the inner conductive spring 520*a*, respectively. The two outer conductive members 540*a* are respectively disposed in the two bases 300*a* and abut against the two ends of the outer conductive spring 510*a*, respectively. Specifically, the two inner conductive members 530*a* are disposed at the inner sides of the two partition walls 320*a*, respectively. The two outer conductive members 540*a* are disposed at the outer side the two partition walls 320*a*, respectively. The partition walls 320*a* are configured to electrically separate the inner conductive members 530*a* and the outer conductive members 540*a*. The inner conductive members 530*a* and the outer conductive members 540*a* are exemplarily as sheet structures. Each of the inner conductive members 530*a* and each of the outer conductive members 540*a* include an annular body 531*a*, 541*a* and a conductive terminal 532*a*, 542*a*. The conductive terminals 532*a*, 542*a* extend outward from the annular bodies 531*a*, 541*a*, respectively. The annular bodies 531*a* abut against the inner conductive spring 520*a*. The annular bodies 541*a* abut against the outer conductive spring 510*a*. With the annular bodies 531*a*, 541*a*, the bases 300*a* have 360 degrees of freedom of rotation when the bases 300*a* rotate about the axial direction A. That is, no matter how many degrees the bases 300*a* rotate about the axial direction A, the inner conductive spring 520*a* and the outer conductive spring 510*a* are capable of contacting with the inner conductive members 530*a* and the outer conductive members 540*a* constantly.

Figure 6:
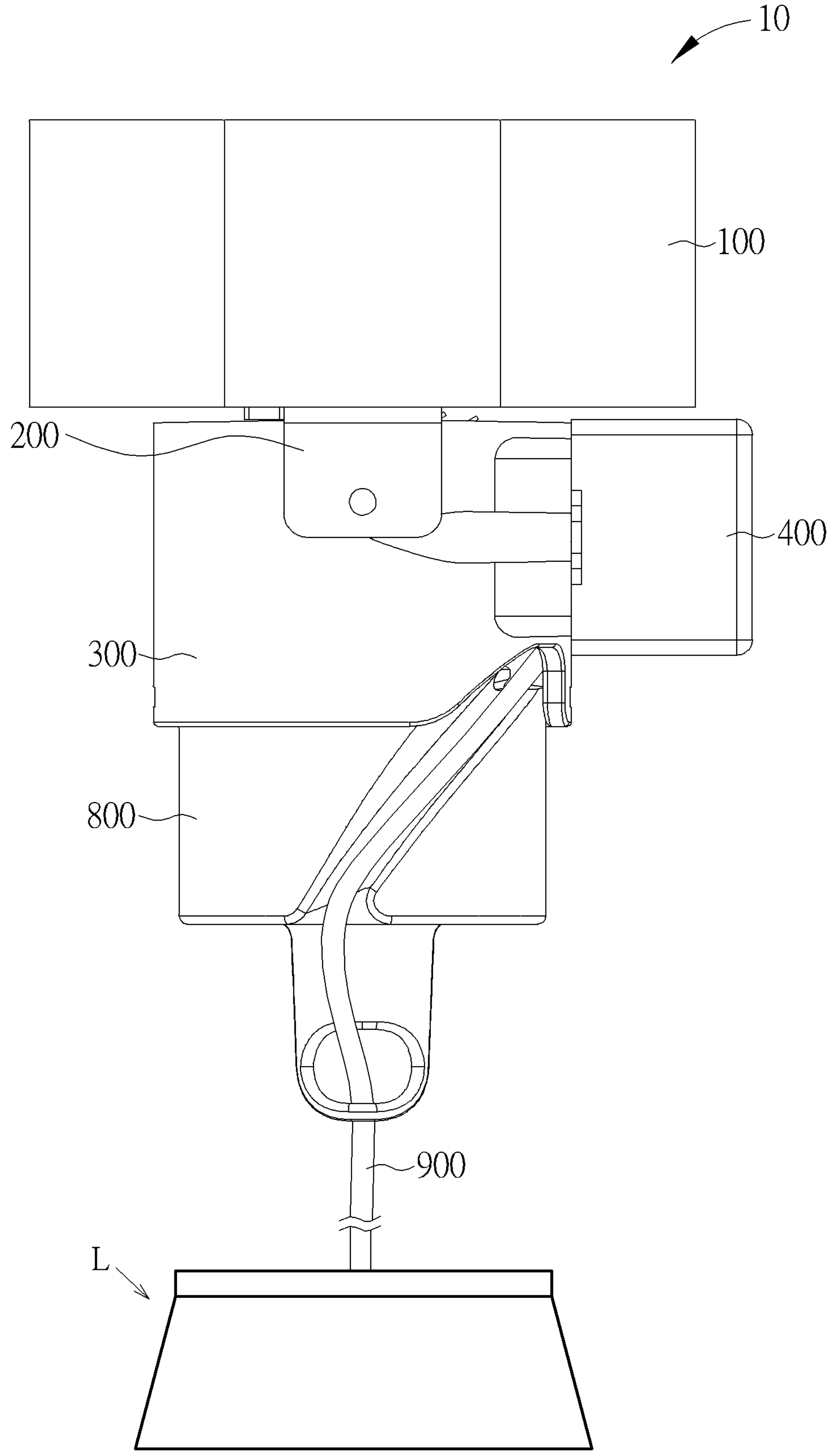
FIG. 6 is a schematic view showing a combination state of a lamp according to yet another embodiment of the present disclosure.

In the two bases 300*a*, the inner conductive member 530*a* and the outer conductive member 540*a* of one of the bases 300*a* can be connected to a power supply (not shown), and the inner conductive member 530*a* and the outer conductive member 540*a* of the other base 300*a* can be connected to a power consumption unit (such as the lamp body L in FIG. 6). Thereby, the conductive mechanism 20*a* can be configured to electrically connect the power supply and the power consumption unit. Preferably, the conductive mechanism 20*a* is applied to a power source and a power consumption unit capable of displacing relative to each other.

The two bases 300*a* can include at least one through hole 340*a*, respectively. A portion of at least one of the inner conductive member 530*a* and the outer conductive member 540*a* passes through the through hole 340*a* and is connected to the power supply or the power consumption unit. Herein, the conductive terminals 532*a*, 542*a* of each of the inner conductive members 530*a* and each of the outer conductive members 540*a* pass through the through hole 340*a*, which is exemplarily, and the present disclosure is not limited thereto.

In the embodiment, the two bases 300*a* have the same structure, the two inner conductive members 530*a* have the same structure, and the two outer conductive members 540*a* have the same structure. However, the present disclosure is not limited thereto. The aforementioned elements can be configured with different structures according to practical needs. The bases 300*a* can be made of plastic. The inner conductive members 530*a*, the outer conductive members 540*a*, the inner conductive spring 520*a* and the outer conductive spring 510*a* can be made of conductive materials, such as copper.

Figure 4:
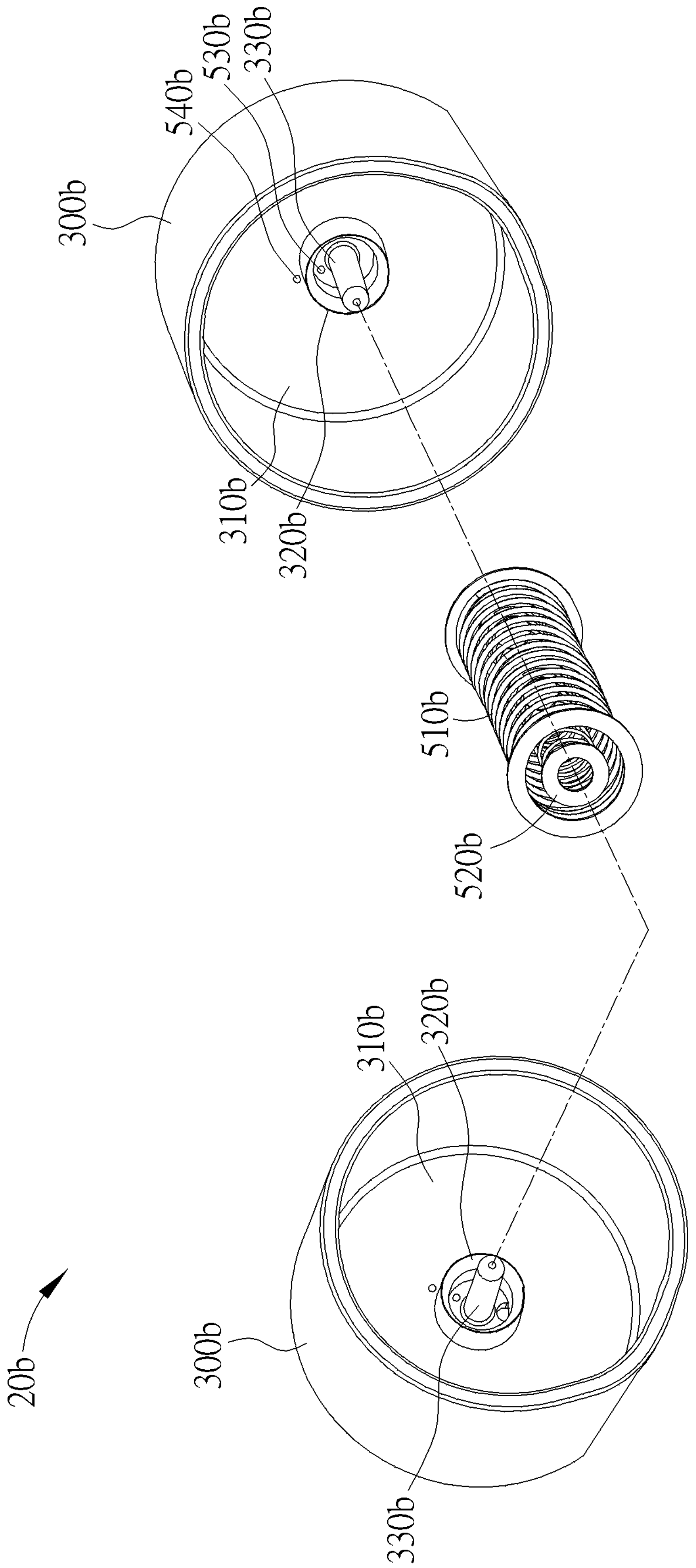
FIG. 4 is an exploded schematic view showing a conductive mechanism according to another embodiment of the present disclosure.

Please refer to FIG. 4, which is an exploded schematic view showing a conductive mechanism 20*b* according to another embodiment of the present disclosure. The conductive mechanism 20*b* includes two bases 300*b*, an inner conductive spring 520*b*, an outer conductive spring 510*b*, two inner conductive members 530*b* and two outer conductive members 540*b*. Each of the bases 300*b* includes a surface 310*b*, a partition wall 320*b* and a protruding pole 330*b*. The main differences between the conductive mechanism 20*b* and the conductive mechanism 20*a* are explained below. Two ends of each of the inner conductive spring 520*b* and the outer conductive spring 510*b* are formed with ring-shaped end faces. In the embodiment, the inner conductive members 530*b* and the outer conductive members 540*b* adopt cylindrical structures, which are different from the sheet structures of the inner conductive members 530*a* and the outer conductive members 540*a* in FIG. 1. Specifically, a portion of each of the inner conductive members 530*b* and the outer conductive members 540*b* is embedded in the base 300*b*, and another portion of each of the inner conductive members 530*b* and the outer conductive members 540*b* protrudes from the surface 310*b* of the base 300*b* and abuts against the inner conductive spring 520*b* or the outer conductive spring 510*b*. As shown in FIG. 4, only one end of cylindrical structure protrude from the surface 310*b* of the base 300*b*. Moreover, the designs of the outer conductive spring 520*b* and the inner conductive spring 510*b* in FIG. 4 are also different from the outer conductive spring 520*a* and the inner conductive spring 510*a* in FIG. 1. With the two ends of each of the inner conductive spring 520*b* and the outer conductive spring 510*b* formed with ring-shaped end faces, the bases 300*b* can have 360 degrees of freedom of rotation when the bases 300*b* rotate about the axial direction A. In the embodiment, the other end (not shown) of each of the inner conductive members 530*b* and the outer conductive members 540*b* can be exposed or protrude from another surface (not shown) of the base 300*b* opposite to the surface 310*b*, and is configured to connect with the power supply or the power consumption unit disposed outside the conductive mechanism 20*b*.

Figure 5:
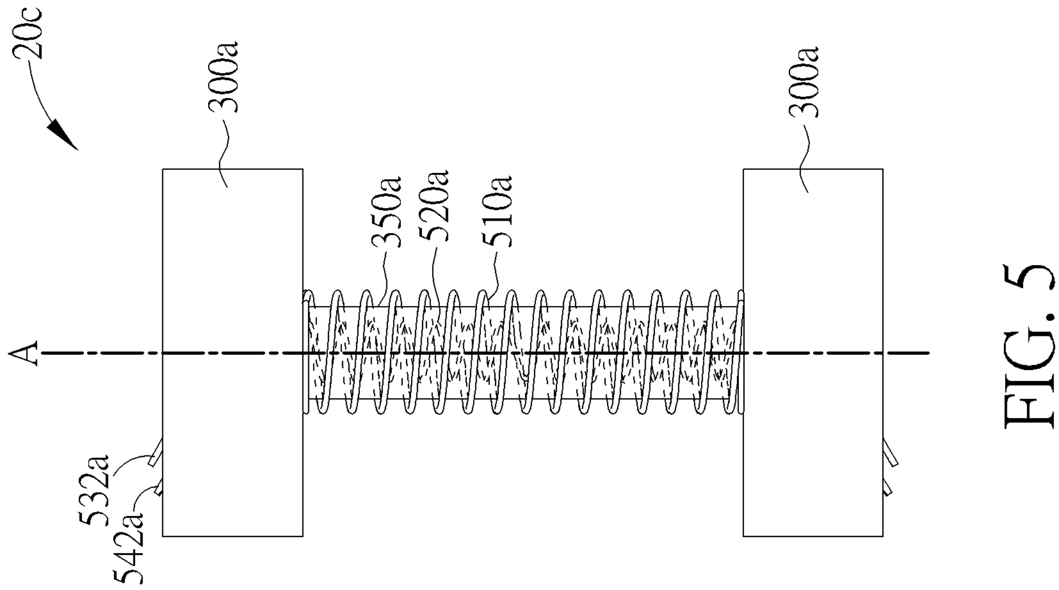
FIG. 5 is a schematic view showing a combination state of a conductive mechanism according to yet another embodiment of the present disclosure.
Figure 11:
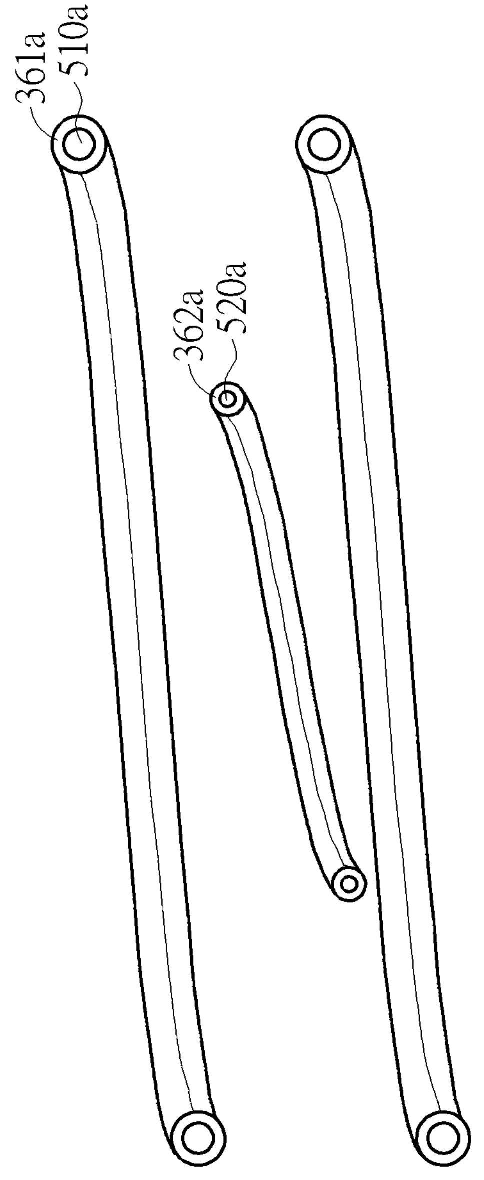
FIG. 11 is a cross-sectional view of a portion of a conductive mechanism according to yet another embodiment of the present disclosure, which is corresponding to a portion P in FIG. 2 and is enlarged.

FIG. 5 is a schematic view showing a combination state of a conductive mechanism 20*c* according to yet another embodiment of the present disclosure. The main difference between the conductive mechanism 20*c* and the conductive mechanism 20*a* is the conductive mechanism 20*c* further including an insulation sleeve 350*a*. In order to show the relative positions of the insulation sleeve 350*a*, the inner conductive spring 520*a* and the outer conductive spring 510*a*, the inner conductive spring 520*a* is shown with dotted lines. The insulation sleeve 350*a* is disposed between the inner conductive spring 520*a* and the outer conductive spring 510*a*. Thereby, it can ensure that when the two bases 300*a* are rotated or shifted relative to each other, the inner conductive spring 520*a* does not directly contact the outer conductive spring 510*a* to cause a short circuit. However, the present disclosure is not limited thereto. Please refer to FIG. 11, which is a cross-sectional view of a portion of a conductive mechanism (not labeled) according to yet another embodiment of the present disclosure. The portion of the conductive mechanism shown in FIG. 11 is corresponding to a portion P shown in FIG. 2 and is enlarged. In FIG. 11, the conductive mechanism can further include an inner insulating layer 362*a* and an outer insulating layer 361*a*. The inner insulating layer 362*a* is disposed on a surface of the inner conductive spring 520*a*, and the outer insulating layer 361*a* is disposed on a surface of the outer conductive spring 510*a*, which can also prevent the inner conductive spring 520*a* from directly contacting the outer conductive spring 510*a* to cause the short circuit.

Figure 7:
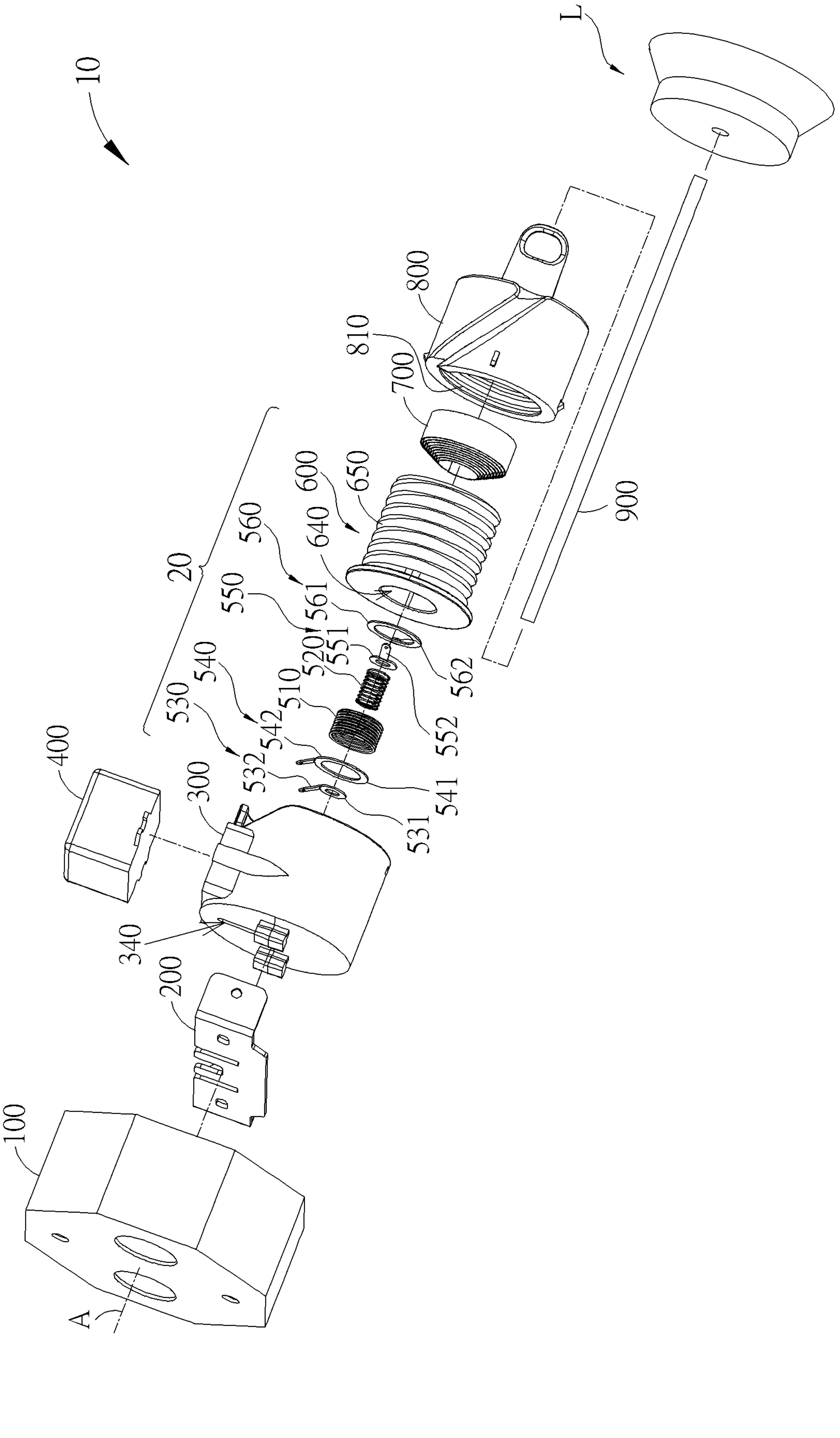
FIG. 7 is an exploded schematic view of the lamp of FIG. 6.
Figure 8:
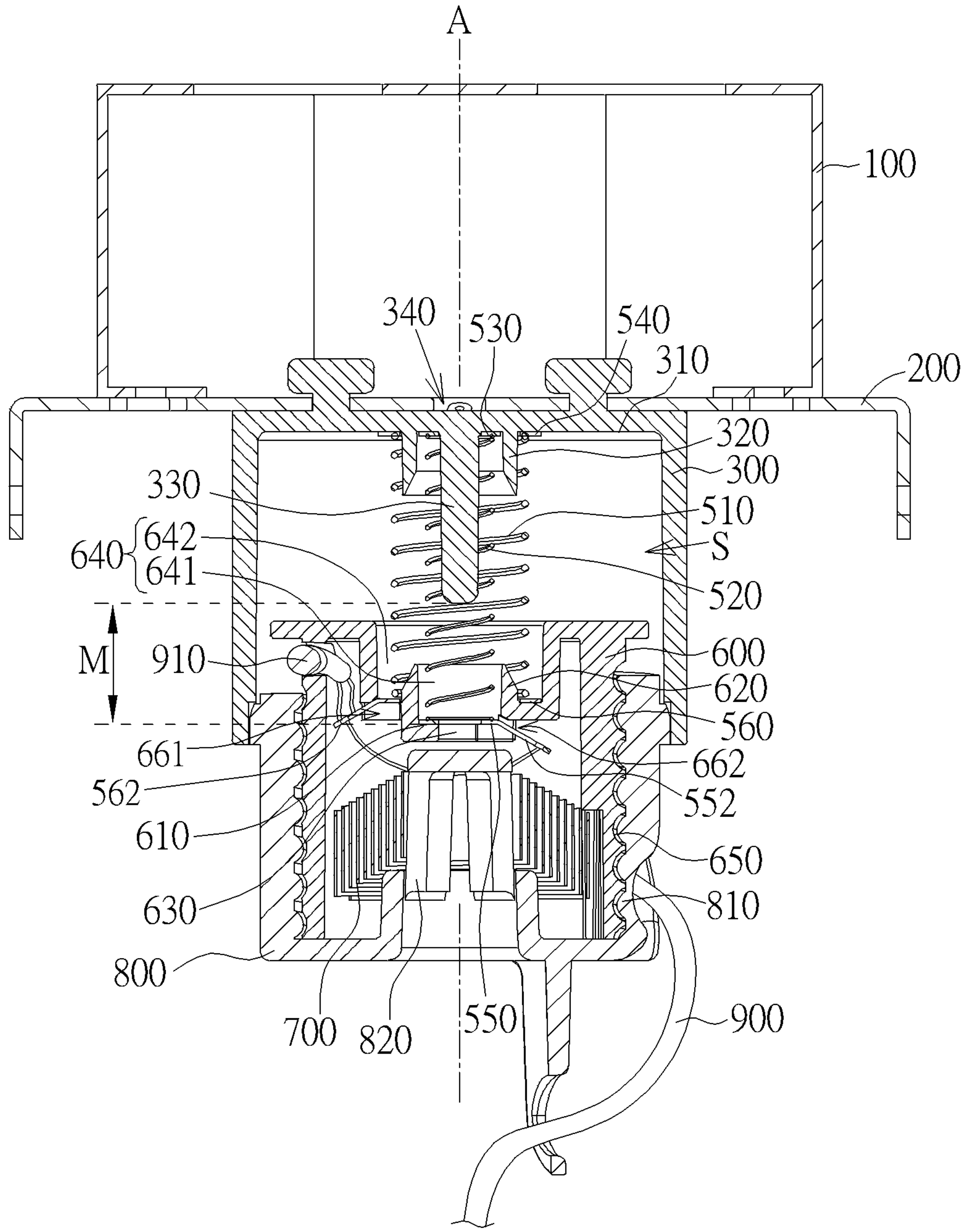
FIG. 8 is a partial cross-sectional view of the lamp of FIG. 6.
Figure 9:
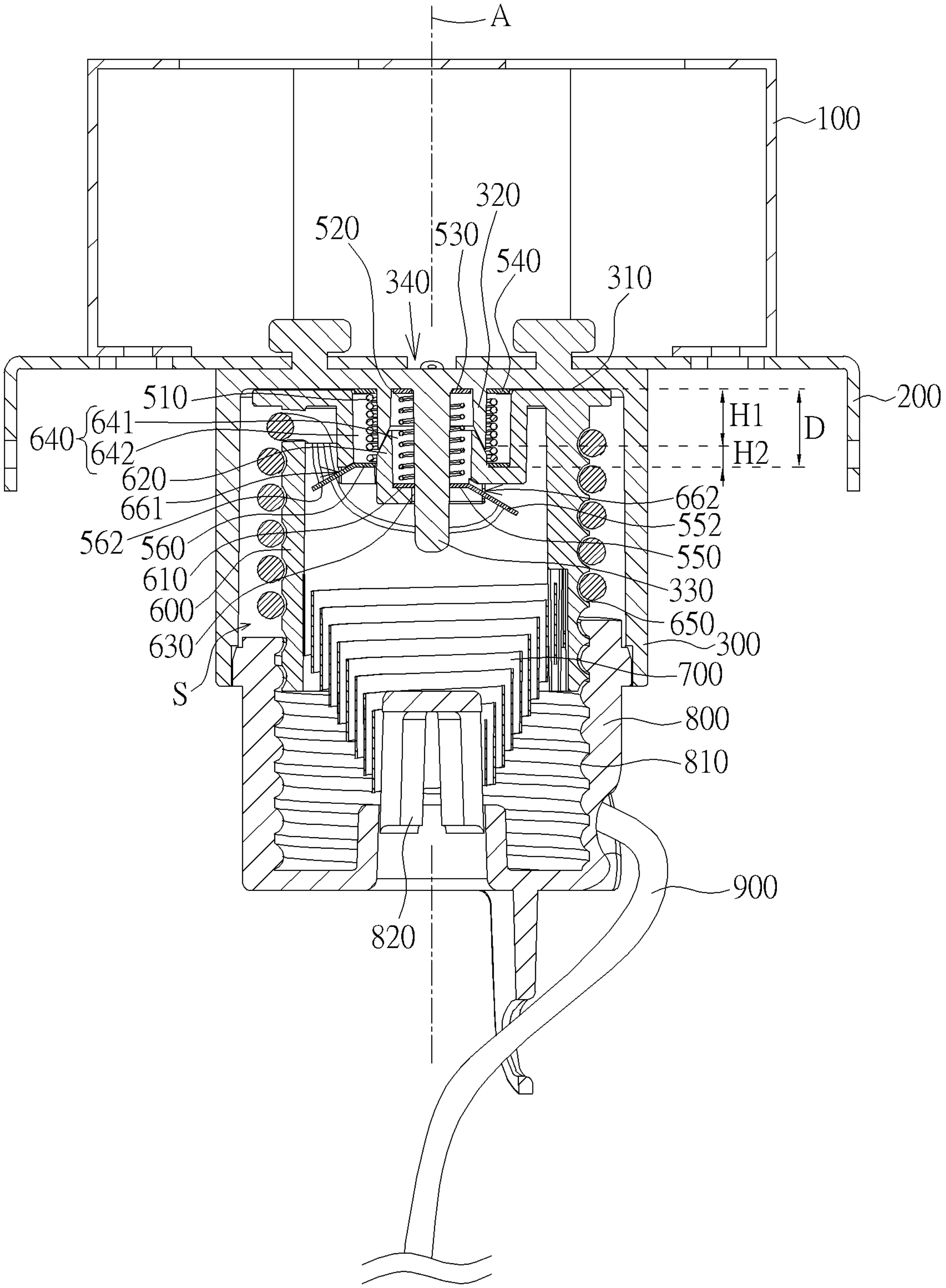
FIG. 9 is another partial cross-sectional view of the lamp of FIG. 6.
Figure 10:
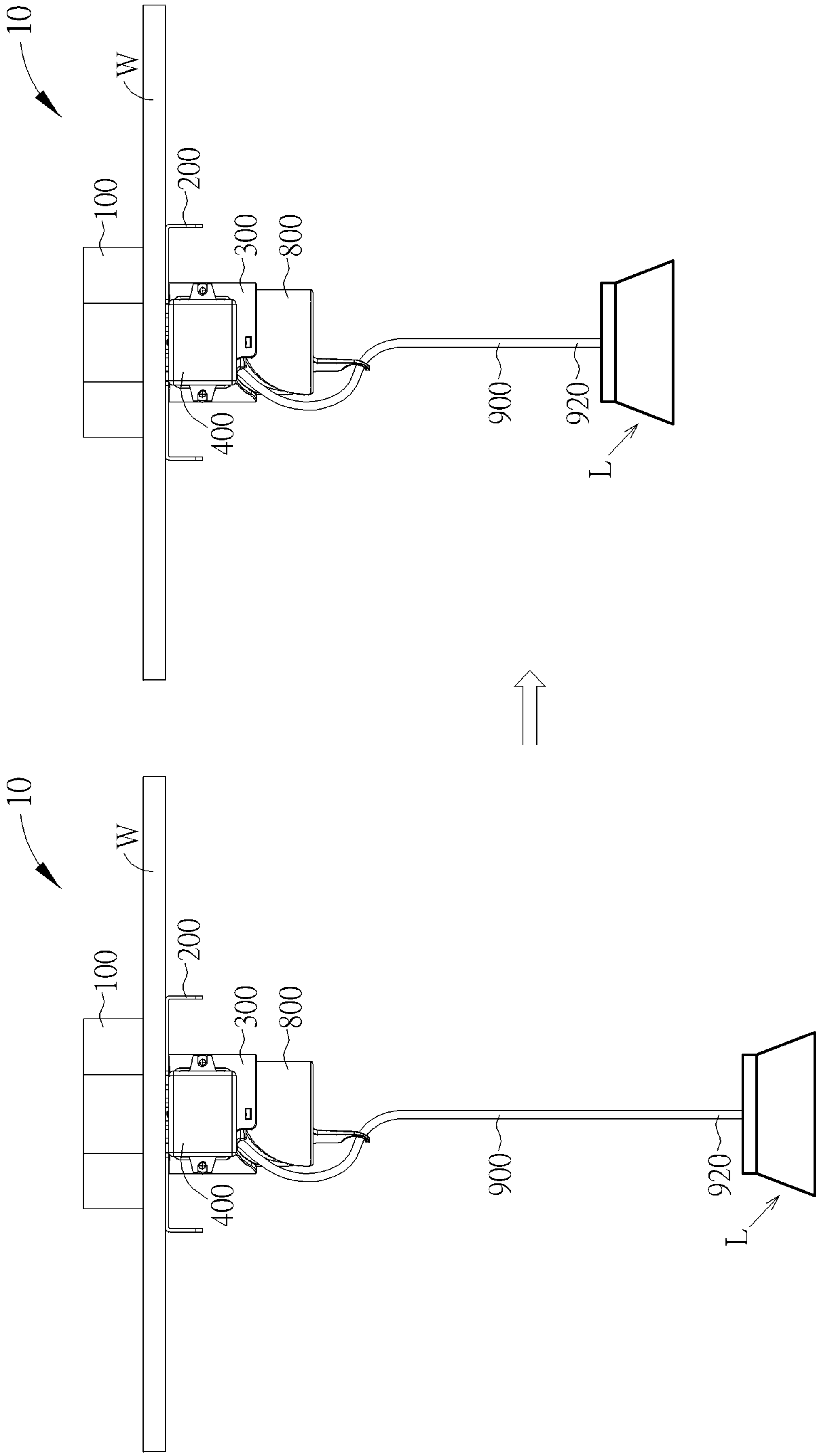
FIG. 10 is a schematic view showing the lamp of FIG. 6 with different hanging lengths.

Please refer to FIG. 6 to FIG. 10. FIG. 6 is a schematic view showing a combination state of a lamp 10 according to yet another embodiment of the present disclosure. FIG. 7 is an exploded schematic view of the lamp 10 of FIG. 6. FIG. 8 is a partial cross-sectional view of the lamp 10 of FIG. 6. FIG. 9 is another partial cross-sectional view of the lamp 10 of FIG. 6. FIG. 10 is a schematic view showing the lamp 10 of FIG. 6 with different hanging lengths. In FIG. 8 and FIG. 9, the lamp body L is omitted. In FIG. 10, the lamp 10 is installed on an external support W, the external support W can be a ceiling. The lamp 10 includes the conductive mechanism 20 and the lamp body L. The conductive mechanism 20 includes a first base 300, a second base 600, an outer conductive spring 510, an inner conductive spring 520, a first inner conductive member 530, a second inner conductive member 550, a first outer conductive member 540 and a second outer conductive member 560. The lamp body L is electrically connected to the second inner conductive member 550, the inner conductive spring 520, the second outer conductive member 560 and the outer conductive spring 510. For example, the second inner conductive member 550 and the inner conductive spring 520 located at the inner side is connected to positive electricity, the second outer conductive member 560 and the outer conductive spring 510 located at the outer side are connected to negative electricity. A proper distance is maintained between the second inner conductive member 550 and the inner conductive spring 520 located at the inner side and the second outer conductive member 560 and the outer conductive spring 510 located at the outer side to avoid the short circuit.

The main difference between the conductive mechanism 20 and the conductive mechanism 20*a* is that the first base 300 and the second base 600 are configured in different structures. Specifically, the first base 300 includes a surface 310, a partition wall 320 and a protruding pole 330. The partition wall 320 protrudes relative to the surface 310, the protruding pole 330 protrudes relative to the surface 310 and is disposed at the inner side of the partition wall 320. The second base 600 includes a surface 610, a partition wall 620 and a penetrating hole 630. The partition wall 620 protrudes relative to the surface 610. The penetrating hole 630 corresponds to the protruding pole 330. The penetrating hole 630 and the protruding pole 330 are arranged along the axial direction A. As shown in FIG. 8, when the inner conductive spring 520 and the outer conductive spring 510 are in an elongated state, a spaced distance M is between the protruding pole 330 and the penetrating hole 630, as shown in FIG. 9. When the inner conductive spring 520 and the outer conductive spring 510 are in a compressed state, and the protruding pole 330 correspondingly inserts in the penetrating hole 630, and the spaced distance M no longer exists. Thereby, a longer protruding pole 330 can be arranged to improve the effect for positioning the inner conductive spring 520. Moreover, the inner conductive spring 520 and the outer conductive spring 510 can have a shorter compressed length. When the length of the wire 900 desired to be wound and unwound is fixed, it is beneficial to reduce the volume of the lamp 10, which are explained in the relevant description below.

One end of the second base 600 is formed with a recess 640. The surface 610 is located at a bottom of the recess 640. The recess 640 is separated into an inner recess 641 and an outer recess 642 by the partition wall 620. At least a portion of the inner conductive spring 520 is accommodated in the inner recess 641, and at least a portion of the outer conductive spring 510 is accommodated in the outer recess 642. Thereby, the effect for positioning the inner conductive spring 520 and the outer conductive spring 510 can be improved. As shown in FIG. 9, the recess 640 has a recess depth D. The partition wall 320 has a protruding height H1. The partition wall 620 has a protruding height H2. A sum of the protruding height H1 of the partition wall 320 and the protruding height H2 of the partition wall 620 is equal to or is substantially equal to the recess depth D. Thereby, it is beneficial to reduce the volume of the lamp 10, which are explained in the relevant description below.

The first base 300 includes a through hole 340, the annular bodies 531, 541 of the first inner conductive member 530 and the first outer conductive member 540 are disposed at the inner side and the outer side of the partition wall 320, respectively. The conductive terminals 532, 542 pass through the through hole 340 and is connected to the power supply (not shown). The configuration between the conductive terminals 532, 542 and the through hole 340 can refer to the configuration the conductive terminals 532*a*, 542*a* and the through hole 340*a* in FIG. 2. The second base 600 includes through holes 661, 662. The annular bodies 551, 561 of the second inner conductive member 550 and the second outer conductive member 560 are respectively disposed at the inner side and the outer side of the partition wall 620. The conductive terminals 552, 562 pass through the through holes 662, 661 respectively and are connected to the lamp body L. Herein, the conductive terminals 552, 562 are connected with the lamp body L through the wire 900.

Details of the conductive mechanism 20 may be the same as that of the conductive mechanisms 20*a*, 20*b* and 20*c*, and are not be repeated herein.

Please refer to FIG. 7, the lamp 10 can optionally include a power distributing box 100, a frame 200, a driving member 400, a dynamic elastic member 700, a housing 800 and the wire 900. The power distributing box 100 can be configured to accommodate a power cord and related electronic components. The frame 200 can be configured to fix the first base 300 to the external support W, so that the relative position between the first base 300 and the external support W is fixed. The driving member 400 can be configured to convert an alternating current of a utility power into a direct current and then supply the direction current to the lamp 10 through the conductive wire. The dynamic elastic member 700 can be configured to provide kinetic energy for the second base 600 to rotate relative to the housing 800. One end of the dynamic elastic member 700 can be connected to the central pole 820 of the housing 800, and the other end of the dynamic elastic member 700 can be connected to the second base 600. Thereby, when the second base 600 is displaced along the axial direction A relative to the central pole 820, the dynamic elastic member 700 can be deformed to accumulate an elastic restoring force, and the elastic restoring force can provide the kinetic energy for the second base 600 to rotate relative to the housing 800.

The housing 800 and the first base 300 together form an accommodating space S. The inner conductive spring 520, the outer conductive spring 510, the first inner conductive member 530, the first outer conductive member 540, the second inner conductive member 550, the second outer conductive member 560, the second base 600 and the dynamic elastic member 700 are disposed in the accommodating space S. An inner surface of the housing 800 is formed with an internal thread structure 810. An outer surface of the second base 600 is formed with an external thread structure 650. The external thread structure 650 is cooperated with the internal thread structure 810, so that the second base 600 is capable of displacing along the axial direction A by rotating relative to the first base 300.

The wire 900 electrically connects the lamp body L and the inner conductive spring 520 and the outer conductive spring 510. A first end 910 of the wire 900 is connected to the second base 600 and is wound along the external thread structure 650 of the second base 600. The second end 920 of the wire 900 is connected to the lamp body L. As the second base 600 is displaced toward the first base 300 along the axial direction A, a portion of the wire 900 is capable of being wound around the external thread structure 650 of the second base 600. Specifically, as the second base 600 is displaced toward the first base 300 along the axial direction A, i.e., the state changing from FIG. 8 to FIG. 9, lengths of the inner conductive spring 520 and the outer conductive spring 510 parallel to the axial direction A are shortened, so that a portion of the wire 900 is capable of being wound around the external thread structure 650 of the second base 600. Accordingly, the hanging length of the wire 900 is shortened, i.e., the state changing from the left side to the right side of FIG. 10. As the second base 600 displaces away from the first base 300 along the axial direction A, i.e., the state changing from FIG. 9 to FIG. 8, the lengths of the inner conductive spring 520 and the outer conductive spring 510 parallel to the axial direction A are elongated, so that a portion of the wire 900 is capable of being separated from the external thread structure 650 of the second base 600. Accordingly, the hanging length of the wire 900 is lengthened, i.e., the state changing from the right side to the left side of FIG. 10. Since at least one end of each of the inner conductive spring 520 and the outer conductive spring 510 is capable of rotating relative to the first base 300 and/or the second base 600, when the state of the lamp 10 is switched between FIG. 8 and FIG. 9, the inner conductive spring 520 and the outer conductive spring 510 can be prevented from twisting and entangling. Therefore, there is no need to reserve a space for the inner conductive spring 520 and the outer conductive spring 510 to twist and entangle, which is beneficial to reduce the volume of the lamp 10. In addition, the dynamic elastic member 700, the inner conductive spring 520 and the outer conductive spring 510 share the accommodating space S as the space for deformation. There is no need to dispose independent spaces in the lamp 10 for the dynamic elastic member 700 and the inner and outer conductive springs 520, 510, which is beneficial to further reduce the volume of the lamp 10. As shown in FIG. 8 and FIG. 9, the deformation amounts of the inner conductive spring 520 and the outer conductive spring 510 are related to the displacement amount of the second base 600, and thus can affect the wound length and unwound length of the wire 900. That is, when the deformation amounts of the inner and outer conductive springs 520, 510 are greater, the wound length or the unwound length of the wire 900 is longer. According to the present disclosure, with the protruding pole 330 can correspondingly insert in the penetrating hole 630, the inner conductive spring 520 and the outer conductive spring 510 are allowed to generate larger deformation amounts, which is beneficial to increase the wound length or the unwound length of the wire 900. On the other hand, when the length of the wire 900 to be wound and unwound is fixed, the space required by the conductive mechanism 20 of the present disclosure is less (the length along the axial direction A is shorter), and the volume of the lamp 10 can be further reduced. According to the present disclosure, with the second base 600 is formed with the recess 640, and the sum of the protruding heights H1, H2 of the partition walls 320, 620 is equal or substantially equal to the recess depth D, when the second base 600 is displaced to the highest position, as shown in FIG. 9, the top end of the second base 600 is capable of abutting against the surface 310 of the first base 300, so that the inner and outer conductive springs 520, 510 are completely accommodated in the recess 640 without occupying additional space, and the volume of the lamp 10 can be further reduced. Compared with the conventional pendant lamp having the conductive wires received in a space behind the ceiling, the conductive mechanism 20 of the present disclosure is more beneficial to reduce the space for receiving the wire 900 and improve the convenience of receiving the wire 900. Accordingly, the appearance of the lamp 10 is simpler, and the safety concerns caused by the poor contact of the electrical connection between the wire 900 and the lamp 10 can be reduced.

Compared with the prior art, the conductive mechanism of the present disclosure adopts the inner and outer conductive springs as conductive wires, and at least one end of each of the inner and outer conductive springs rotatably abuts against the surface of the base, the conductive mechanism has degrees of freedom of shift and rotation. When the conductive mechanism is applied to electronic products, it is beneficial to enhance the design freedom of electronic products. The lamp of the present disclosure can have a reduced volume by adopting the aforementioned conductive mechanism.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A conductive mechanism, comprising:
- two bases opposite to each other, each of the bases comprising:
  - a surface; and
  - a partition wall protruding relative to the surface;
- an inner conductive spring disposed at inner sides of the two partition walls of the two bases; and
- an outer conductive spring disposed at outer sides of the two partition walls of the two bases;
- wherein at least one of two ends of each of the inner conductive spring and the outer conductive spring rotatably abuts against the surface of one of the bases;
- wherein one of the bases further comprises a protruding pole protruding relative to the surface and disposed at the inner side of the partition wall, and the inner conductive spring being sleeved on the protruding pole;
- wherein another one of the bases further comprises a penetrating hole corresponding to the protruding pole, when the inner conductive spring and the outer conductive spring are in an elongated state, a spaced distance is between the protruding pole and the penetrating hole, and when the inner conductive spring and the outer conductive spring are in a compressed state, the protruding pole correspondingly inserts in the penetrating hole.

2. The conductive mechanism of claim 1, wherein the conductive mechanism defines an axial direction, and the two bases are opposite to each other in a manner that the two bases are capable of displacing along the axial direction and/or rotating about the axial direction.

3. The conductive mechanism of claim 1, wherein the conductive mechanism defines an axial direction, and the two bases are opposite to each other in a manner that the two bases are capable of deviating from the axial direction.

4. The conductive mechanism of claim 1, wherein one end of the base is formed with a recess, the surface is located at a bottom of the recess, the recess is separated into an inner recess and an outer recess by the partition wall, at least a portion of the inner conductive spring is accommodated in the inner recess, and at least a portion of the outer conductive spring is accommodated in the outer recess.

5. The conductive mechanism of claim 4, wherein the recess has a recess depth, each of the partition walls has a protruding height, and a sum of the protruding heights of the two partition walls is equal to the recess depth.

6. The conductive mechanism of claim 1, further comprising:
- two inner conductive members respectively disposed in the two bases and respectively abutting against the two ends of the inner conductive spring; and
- two outer conductive members respectively disposed in the two bases and respectively abutting against the two ends of the outer conductive spring.

7. The conductive mechanism of claim 6, wherein the inner conductive member and the outer conductive member of one of the bases are connected to a power supply, and the inner conductive member and the outer conductive member of another one of the bases are connected to a power consumption unit.

8. The conductive mechanism of claim 7, wherein at least one of the bases further comprises:
- at least one through hole, wherein a portion of at least one of the two inner conductive members and the two outer conductive members passes through the through hole and is connected to the power supply or the power consumption unit.

9. The conductive mechanism of claim 6, wherein a portion of at least one of the two inner conductive members and the two outer conductive members is embedded in one of the bases, and another portion of the at least one of the two inner conductive members and the two outer conductive members protrudes from the surface of the base and abuts against one of the inner conductive spring and the outer conductive spring.

10. The conductive mechanism of claim 6, wherein at least one of the two inner conductive members and the two outer conductive members comprises:
- an annular body abutting against one of the inner conductive spring and the outer conductive spring; and
- a conductive terminal extending outward from the annular body.

11. The conductive mechanism of claim 1, further comprising:
- an insulation sleeve disposed between the inner conductive spring and the outer conductive spring.

12. The conductive mechanism of claim 1, further comprising:

an inner insulating layer disposed on a surface of the inner conductive spring; and an outer insulating layer disposed on a surface of the outer conductive spring.

13. A lamp, comprising:

the conductive mechanism of claim 1; and a lamp body electrically connected to the inner conductive spring and the outer conductive spring.

14. The lamp of claim 13, wherein the conductive mechanism defines an axial direction, the two bases are respectively a first base and a second base, and the lamp further comprises:

a housing, wherein the housing and the first base together form an accommodating space, an inner surface of the housing is formed with an internal thread structure, the second base is disposed in the accommodating space, an outer surface of the second base is formed with an external thread structure, the external thread structure is cooperated with the internal thread structure, so that the second base is capable of displacing along the axial direction by rotating relative to the first base.

15. The lamp of claim 14, comprising:

a wire electrically connecting the lamp body and the inner conductive spring and the outer conductive spring, wherein when the second base is displaced along the axial direction by rotating relative to the first base, a portion of the wire is capable of being wound around or separated from the external thread structure of the second base.

16. The lamp of claim 15, wherein:

as the second base is displaced toward the first base along the axial direction, a portion of the wire is capable of being wound around the external thread structure of the second base, so that a hanging length of the wire is shortened, and lengths of the inner conductive spring and the outer conductive spring parallel to the axial direction are shortened;

as the second the base displaces away from the first base along the axial direction, a portion of the wire is capable of being separated from the external thread structure of the second base, so that the hanging length of the wire are lengthened, and lengths of the inner conductive spring and the outer conductive spring parallel to the axial direction are elongated.

17. A lamp, comprising:

a conductive mechanism, comprising:

two bases opposite to each other, each of the bases comprising:

a surface; and a partition wall protruding relative to the surface;

an inner conductive spring disposed at inner sides of the two partition walls of the two bases; and an outer conductive spring disposed at outer sides of the two partition walls of the two bases;

wherein at least one of two ends of each of the inner conductive spring and the outer conductive spring rotatably abuts against the surface of one of the bases, and the conductive mechanism defines an axial direction, the two bases are respectively a first base and a second base;

a lamp body electrically connected to the inner conductive spring and the outer conductive spring;

a housing, wherein the housing and the first base together form an accommodating space, an inner surface of the housing is formed with an internal thread structure, the second base is disposed in the accommodating space, an outer surface of the second base is formed with an external thread structure, the external thread structure is cooperated with the internal thread structure, so that the second base is capable of displacing along the axial direction by rotating relative to the first base; and a wire electrically connecting the lamp body and the inner conductive spring and the outer conductive spring, wherein when the second base is displaced along the axial direction by rotating relative to the first base, a portion of the wire is capable of being wound around or separated from the external thread structure of the second base.

18. The lamp of claim 17, wherein:

as the second base is displaced toward the first base along the axial direction, a portion of the wire is capable of being wound around the external thread structure of the second base, so that a hanging length of the wire is shortened, and lengths of the inner conductive spring and the outer conductive spring parallel to the axial direction are shortened;

as the second the base displaces away from the first base along the axial direction, a portion of the wire is capable of being separated from the external thread structure of the second base, so that the hanging length of the wire are lengthened, and lengths of the inner conductive spring and the outer conductive spring parallel to the axial direction are elongated.

* * * * *